(12) United States Patent
Santra et al.

(10) Patent No.: US 7,449,062 B2
(45) Date of Patent: Nov. 11, 2008

(54) CEMENT COMPOSITIONS FOR REDUCING GAS OR WATER MIGRATION AND METHODS OF USING THE SAME

(75) Inventors: Ashok K Santra, Duncan, OK (US); Mfon Antia, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/947,454

(22) Filed: Nov. 29, 2007

(65) Prior Publication Data

US 2008/0070814 A1 Mar. 20, 2008

Related U.S. Application Data

(62) Division of application No. 11/372,001, filed on Mar. 9, 2006, now Pat. No. 7,325,611.

(51) Int. Cl.
*C04B 24/20* (2006.01)
(52) U.S. Cl. .............. 106/724; 106/726; 106/727; 106/823; 524/2
(58) Field of Classification Search .......... 106/724, 106/726, 823, 727; 524/2
See application file for complete search history.

(56) References Cited

U.S. PATENT DOCUMENTS

| | | | | |
|---|---|---|---|---|
| 3,954,677 A | * | 5/1976 | Law | |
| 4,125,410 A | * | 11/1978 | Natsuume | .................. 524/6 |
| 4,164,426 A | | 8/1979 | Sinka et al. | |
| 4,239,550 A | * | 12/1980 | Kohler | .................. 106/823 |
| 4,469,518 A | | 9/1984 | McKenzie | |
| 4,515,635 A | | 5/1985 | Rao et al. | |
| 4,555,269 A | | 11/1985 | Rao et al. | |
| 4,601,758 A | * | 7/1986 | Nelson | .................. 523/130 |
| 4,657,948 A | | 4/1987 | Roark et al. | |
| 4,684,674 A | | 8/1987 | Brooks | |
| 4,746,367 A | | 5/1988 | Meyer | |

(Continued)

FOREIGN PATENT DOCUMENTS

EP 0430644 A1 6/1991

(Continued)

OTHER PUBLICATIONS

Answer 3 of 3 of CA on STN☐☐☐JP 02296804 (Dec. 7, 1990) Kanemori et al. abstract only.*

(Continued)

*Primary Examiner*—Paul Marcantoni
(74) *Attorney, Agent, or Firm*—Lindsie Townsend; Conley Rose, P.C.

(57) ABSTRACT

A method of cementing a wellbore comprising preparing a cement composition comprising a water-soluble aromatic sulfonated polymer, and placing the cement composition into the wellbore, wherein the cement composition develops a compressive strength of greater than about zero in less time than a similar cement composition having a comparable thickening time and lacking a water-soluble aromatic sulfonated polymer. A cement composition comprising a water-soluble aromatic sulfonated polymer, wherein the cement composition develops a compressive strength of greater than about zero in less time than a similar cement composition having comparable thickening time and lacking a water-soluble aromatic sulfonated polymer.

20 Claims, 2 Drawing Sheets

U.S. PATENT DOCUMENTS

| | | | |
|---|---|---|---|
| 4,806,164 A | | 2/1989 | Brothers |
| 4,978,392 A | | 12/1990 | Kilbarger et al. |
| 5,049,446 A | | 9/1991 | Blackwell et al. |
| 5,339,903 A | | 8/1994 | Eoff et al. |
| 5,346,012 A | | 9/1994 | Heathman et al. |
| 5,348,582 A | * | 9/1994 | Herzig et al. ............... 106/696 |
| 5,484,019 A | | 1/1996 | Griffith |
| 5,494,516 A | | 2/1996 | Drs et al. |
| 5,571,318 A | | 11/1996 | Griffith et al. |
| 5,588,488 A | | 12/1996 | Vijn et al. |
| 5,609,681 A | | 3/1997 | Drs et al. |
| 5,806,594 A | * | 9/1998 | Stiles et al. ................ 166/293 |
| 5,913,364 A | | 6/1999 | Sweatman |
| 6,019,835 A | | 2/2000 | Chatterji et al. |
| 6,089,318 A | * | 7/2000 | Laramay et al. ............. 166/293 |
| 6,167,967 B1 | | 1/2001 | Sweatman |
| 6,244,343 B1 | | 6/2001 | Brothers et al. |
| 6,258,757 B1 | | 7/2001 | Sweatman et al. |
| 6,268,406 B1 | | 7/2001 | Chatterji et al. |
| 6,273,191 B1 | | 8/2001 | Reddy et al. |
| 6,336,505 B1 | | 1/2002 | Reddy |
| 6,454,004 B2 | | 9/2002 | Reddy et al. |
| 6,457,524 B1 | | 10/2002 | Roddy |
| 6,497,283 B1 | | 12/2002 | Eoff et al. |
| 6,630,021 B2 | | 10/2003 | Reddy et al. |
| 6,715,552 B2 | | 4/2004 | Eoff et al. |
| 6,739,806 B1 | | 5/2004 | Szymanski et al. |
| 6,743,288 B2 | | 6/2004 | Eoff et al. |
| 6,793,730 B2 | | 9/2004 | Reddy et al. |
| 6,978,835 B1 | | 12/2005 | Reddy et al. |
| 7,004,256 B1 | | 2/2006 | Chatterji et al. |
| 7,021,380 B2 | | 4/2006 | Caveny et al. |
| 7,073,585 B2 | | 7/2006 | Morgan et al. |
| 7,244,303 B2 | | 7/2007 | Chatterji et al. |
| 7,290,613 B2 | | 11/2007 | Santra et al. |
| 2007/0209796 A1 | | 9/2007 | Santra et al. |
| 2008/0011202 A1 | * | 1/2008 | Santra et al. ................ 106/809 |

FOREIGN PATENT DOCUMENTS

| | | |
|---|---|---|
| GB | 1588130 | 4/1981 |
| JP | 08299777 | 11/1996 |

OTHER PUBLICATIONS

Halliburton brochure entitled "Diacel LWL Cement Retarder/Fluid-Loss Additive" dated 1999, 2 pgs.

Halliburton brochure entitled "GasStop HT Cement Additive" dated 1999, 2 pgs.

Halliburton brochure entitled "Halad®-344 Fluid-Loss Additive" dated 1998, 2 pgs.

Halliburton brochure entitled "Halad®-413 Fluid-Loss Additive" dated 1998, 2 pgs.

Halliburton brochure entitled "HR®-25 Cement Retarder" dated 1999, 2 pgs.

Halliburton brochure entitled "HR®-5 Cement Additive" dated 1998, 2 pgs.

Halliburton brochure entitled "Microsand Cement Additive" dated 1999, 2 pgs.

Halliburton brochure entitled "Silicalite Cement Additive" dated 1999, 2 pgs.

Halliburton brochure entitled "SSA-1 Strength-Stabilizing Agent" dated 1998, 2 pgs.

Halliburton brochure entitled "SSA-2 Coarse Silica Flour" dated 1999, 2 pgs.

AllRefer.com reference, "Sulfonic Acid, Organic Chemistry," Apr. 20, 2004, 3 pgs., http:/reference.allrefer.com/encylopedia/S/sulfonic.html, The Columbia Electronic Encyclopedia, 2003, Columbia University Press.

Foreign communication from a related counterpart application—International Search Report and Written Opinion, PCT/GB2005/003780, Dec. 14, 2005, 9 pgs.

Office Action dated Jan. 18, 2007 (14 pages) for U.S. Appl. No. 10/966,937, filed Oct. 15, 2004.

Office Action dated Mar. 21, 2007 (16 pages) for U.S. Appl. No. 11/372,001, filed Mar. 9, 2006.

Notice Of Allowance dated May 24, 2007 (7 pages) for U.S. Appl. No. 10/966,937.

Notice Of Allowance dated Jul. 31, 2007 (4 pages) for U.S. Appl. No. 11/372,001.

Notice Of Allowance dated Sep. 11, 2007 (8 pages) for U.S. Appl. No. 10/966,937.

Patent application entitled "Cement Compositions Comprising Aromatic Sulfonated Polymers and Methods of Using the Same" by Ashok K. Santra, et al., filed Jul. 19, 2007, as U.S. Appl. No. 11/780,192.

Notice Of Allowance dated Nov. 15, 2007 (6 pages), for U.S. Appl. No. 11/372,001, filed Mar. 9, 2006.

Brothers, Lance E., "Synthetic retarder for high-strength cement," SPE/IADC 21976, 1991, pp. 659-665, SPE/IADC Drilling Conference.

Chatterji, J., et al., "Development of a set retarder for foamed cement applications," SPE 80244, 2003, pp. 1-5, Society of Petroleum Engineers Inc.

Christian, W. W., et al., "Gas leakage in primary cementing—a field study and laboratory investigation," Journal of Petroleum Technology, Nov. 1976, pp. 1361-1369, American Institute of Mining, Metallurgical, and Petroleum Engineers, Inc.

Office Action dated Mar. 19, 2008 (18 pages), U.S. Appl. No. 11/780,192, filed Jul. 19, 2007.

* cited by examiner

CEMENT COMPOSITIONS FOR REDUCING GAS OR WATER MIGRATION AND METHODS OF USING THE SAME

CROSS-REFERENCE TO RELATED APPLICATIONS

This is a Divisional Application of U.S. patent application Ser. No. 11/372,001, filed Mar. 9, 2006 and entitled "Cement Compositions For Reducing Gas Or Water Migration And Methods Of Using The Same," which is hereby incorporated by reference herein in its entirety. The subject matter of the present application is related to U.S. patent application Ser. No. 10/966,937, filed on Oct. 15, 2004 and 11/780,192, filed on Jul. 19, 2007, both entitled "Cement Compositions Comprising Aromatic Sulfonated Polymers and Methods of Using Same," which are hereby incorporated herein by reference in their entirety for all purposes.

STATEMENT REGARDING FEDERALLY SPONSORED RESEARCH OR DEVELOPMENT

Not applicable.

BACKGROUND OF THE INVENTION

1. Field of the Invention

The present disclosure generally relates to well cementing, and more particularly to cement compositions for preventing gas or water migration and methods of cementing a wellbore using such cement compositions.

2. Background of the Invention

Zonal isolation refers to the isolation of a subterranean formation or zone, which serves as a source of a natural resource such as oil, or water, from other subterranean formations. To achieve isolation of a subterranean formation, a wellbore is typically drilled down to the subterranean formation while circulating a drilling fluid through the wellbore. After the drilling is terminated, a string of pipe, e.g., casing, is run in the wellbore. Next, primary cementing is typically performed whereby a cement slurry is placed in the annulus and permitted to set into a hard mass, thereby attaching the string of pipe to the walls of the wellbore and sealing the annulus. Subsequent secondary cementing operations such as squeeze cementing may also be performed.

One problem commonly encountered during the placement of a cement slurry in a wellbore is unwanted gas or water migration from the subterranean zone into and through the cement slurry. Gas migration is caused by the behavior of the cement slurry during a transition phase in which the cement slurry changes from a true hydraulic fluid to a highly viscous mass showing some solid characteristics. When first placed in the annulus, the cement slurry acts as a true liquid and thus transmits hydrostatic pressure. However, during the transition phase, certain events occur that cause the cement slurry to lose its ability to transmit hydrostatic pressure. One of those events is the loss of fluid from the slurry to the subterranean zone. Another event is the development of static gel strength, i.e., stiffness, in the slurry. As a result, the pressure exerted on the formation by the cement slurry falls below the pressure of the gas in the formation such that the gas begins to migrate into and through the cement slurry. When gas migration begins, the cement slurry typically has a gel strength of about 100 lbf/100 ft$^2$. The gas migration causes flow channels to form in the cement slurry. Eventually the gel strength of the cement slurry increases to a value sufficient to resist the pressure exerted by the gas in the formation against the slurry. At this point, the cement slurry typically has a gel strength of about 500 lbf/100 ft$^2$. Likewise, prior to setting of the cement slurry, water may flow or migrate into the slurry and form flow channels. The cement slurry then sets into a solid mass.

Unfortunately, the flow channels formed in the cement during such gas or water migration remain in the cement once it has set. Those flow channels can permit further migration of gas or water through the cement even long after the cement is set. Thus, the cement residing in the annulus may be ineffective at maintaining the isolation of the adjacent subterranean formation. To overcome this problem, attempts have been made to design a cement slurry having a shorter transition time, i.e., the period of time during which gas migration into the slurry can occur, which is typically the time ranging from when the gel strength of the slurry is about 100 lbf/100 ft$^2$ (pound force per hundred square foot) to when it is about 500 lbf/100 ft$^2$. While cement slurries having shorter transition times have been developed, those slurries are typically very expensive to prepare. Further, their transition times are still longer than desired.

A particular challenge is cementing at lower temperatures in a formation having the potential for water or gas migration at shallow hole depths, and in particular using lightweight cement slurries such as foamed slurries, water extended slurries, bead-containing slurries, etc. Cement blends, such as Portland or ultrafine cement blends, have been used with accelerators in an effort to obtain rapid setting of the cement and the development of compressive strength. In situations where the temperature is low, i.e. less than about 40° F., an excessive amount of such accelerators have been employed in an effort to facilitate the rapid setting and strength development of a cement composition. However, the addition of an excessive amount of accelerator has often resulted in cement compositions that rapidly form viscous gels with a premature loss of pumpability. Thus there exists an ongoing need for improved methods of eliminating gas or water migration during well cementing to reduce the risk of compromising zonal isolation. Furthermore, a need exists for cement compositions that balance transition time with the need for rapid development of compressive strength.

BRIEF SUMMARY OF SOME OF THE PREFERRED EMBODIMENTS

Disclosed herein is a method of cementing a wellbore comprising preparing a cement composition comprising a water-soluble aromatic sulfonated polymer, and placing the cement composition into the wellbore, wherein the cement composition develops a compressive strength of greater than about zero in less time than a similar cement composition having a comparable thickening time and lacking a water-soluble aromatic sulfonated polymer.

Also disclosed herein is a cement composition comprising a water-soluble aromatic sulfonated polymer, wherein the cement composition develops a compressive strength of greater than about zero in less time than a similar cement composition having comparable thickening time and lacking a water-soluble aromatic sulfonated polymer.

Further disclosed herein is a method of cementing a wellbore comprising preparing a cement composition comprising a water-soluble aromatic sulfonated polymer, and placing the cement composition into the wellbore, wherein the cement composition develops a compressive strength of greater than about zero at a temperature of less than about 80° F. in less time than a similar cement composition having comparable thickening time and lacking a water-soluble aromatic sulfonated polymer and wherein the cement composition has thickening time greater than an alternative similar cement composition lacking a water-soluble aromatic sulfonated polymer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
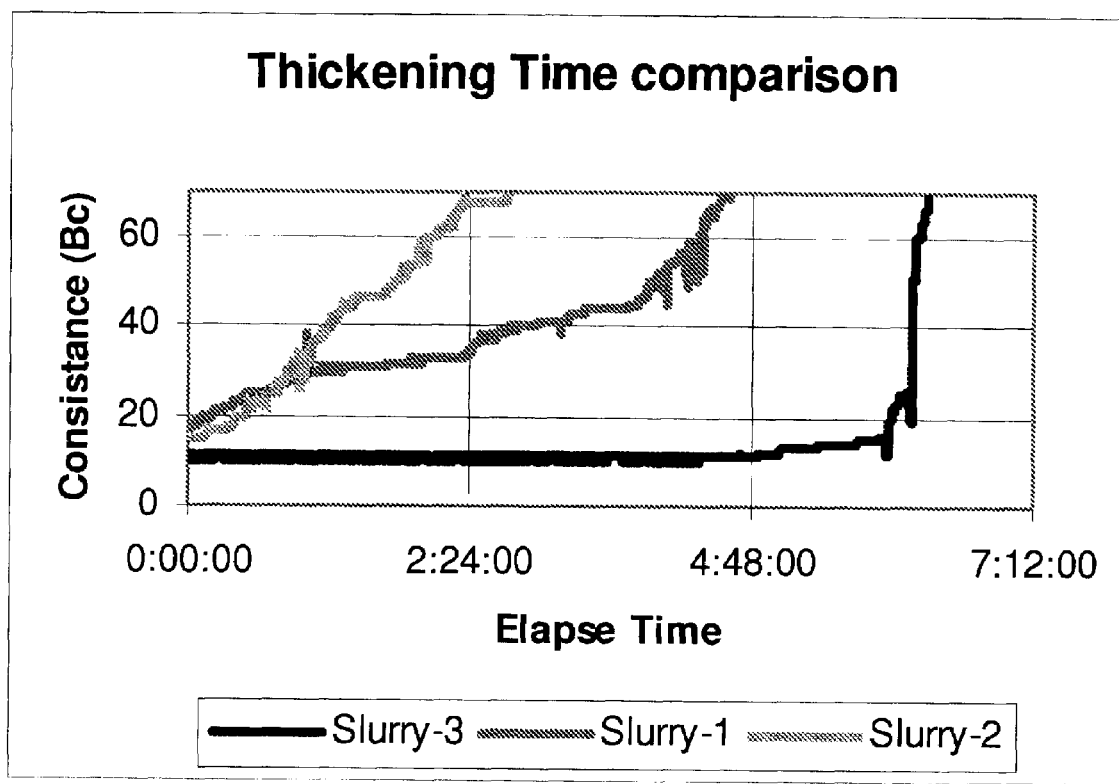
FIG. 1 is a thickening time plot.

Disclosed herein are cement compositions for the reduction of gas or water migration comprising at least one water-soluble aromatic sulfonated polymer (WSASP). Such cement compositions may display improved properties such as a reduced transition time, a lengthened thickening time, a longer zero gel time (ZGT) and the rapid development of compressive strength when compared to cement compositions lacking a WSASP. Furthermore, such compositions may display such improved properties at lower temperatures and in lightweight slurries. Herein a light weight slurry is defined as having slurry a density less than about 14 pounds per gallon (ppg) while lower temperatures are defined as those less than about 80° F.

Cement compositions or slurries may include at least one WSASP. Any suitable WSASP known in the art operable to provide the desired properties described herein may be employed in the cement compositions. In one embodiment, a WSASP comprises a polymeric backbone having sulfonated (i.e., salts of sulfonic acid functional groups) aromatic rings as pendant groups. Examples of such aromatic rings include phenyl rings, naphthyl, anthracenyl or phenanthrenyl rings. Examples of suitable WSASPs include but are not limited to compounds having one of the chemical Structures A-F where M is H, alkali or alkaline earth metal, or ammonium; partially or completely sulfonated polystyrenes such as those having Structure B; poly(styrene sulfonic acid) such as those having Structure A and its alkali or alkaline earth metal or ammonium salts where M=H, alkali or alkaline earth metal, or ammonium; polymers obtained by polymerizing monomers comprising allyloxybenzenesulfonic acid (structure not shown); copolymers of styrene and sulfonated styrene such as those having Structure B; sulfonated gilsonites; sulfonated lignin; copolymers comprising sulfonated styrene, sulfonated alpha-methylstyrene, sulfonated vinyl toluene and the like; and combinations thereof. In some embodiments such aromatic sulfonated polymers may contain small amounts other comonomers such as maleic anhydride, acrylic acid, AMPS (2-acrylamido-2-methyl-1-propane sulfonic acid), methallysulfonic acid, or combinations thereof. Alternatively, the comonomer present in small amounts is styrene sulfonic acid and/or its alkali metal salts. Such additional monomers may be present in less than 10 molar percent of the monomer content of the aromatic sulfonated polymer. In some embodiments, a sulfonated aromatic ring may contain more than one sulfonate group as shown in structures C, E and F.

Suitable WSASPs include without limitation VERSA-TL 130 sulfonated polymer, VERSA-TL-501 sulfonated polymer, VERSA-TL 130 sulfonated polymer, VERSA-TL 77 sulfonated polymer, VERSA-TL 70 sulfonated polymer, VERSA-TL 502 sulfonated polymer which are sulfonated polystrene sodium salts commercially from ALCO Chemical, a division of National Starch and Chemical Company, Chattanooga, Tenn., SOLTEX ADDITIVE SHALE INBIBITOR which is a sodium asphalt sulfonate commercially available from Drilling Specialties Company, The Woodlands, Tex., and BOREMASTER HT/HP which is a filtrate control agent commercially available from Setac Chemical Corporation, Lafayette, La.

In an embodiment, the WSASPs may contain the sulfonated aromatic ring as part of the polymer backbone. Such WSASPs may comprise a linear polymer containing three kinds of unit bonds, i.e., an arylene bond, an ether bond, and a sulfone bond. Examples of such aromatic sulfonated polymers include those represented by the following Structures C—F. It is not necessary that all the aromatic rings are sulfonated in the polymers containing the aromatic rings as part of the polymer backbone. The degree of sulfonation is such that the whole polymer becomes water-soluble either in the acid form or when converted to an alkali or alkaline earth metal or ammonium salt. For the purpose of the present disclosure, a sulfonated polymer with solubility of greater than 1% in a cement composition at ambient temperature is considered water-soluble.

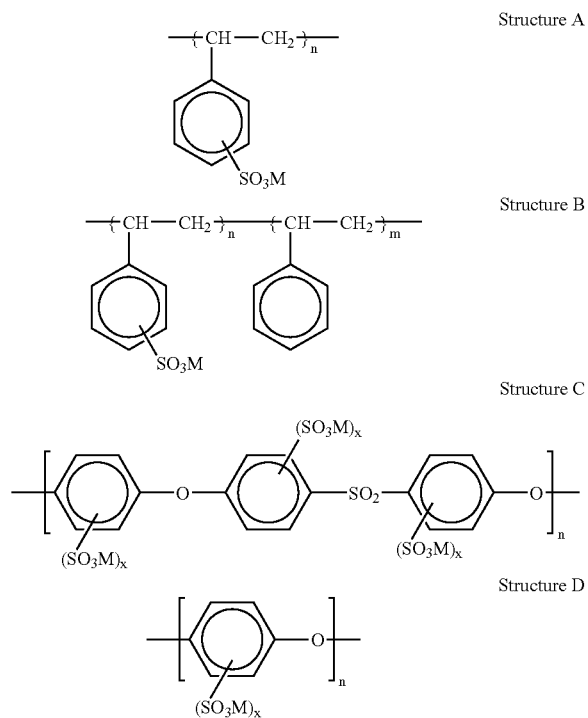

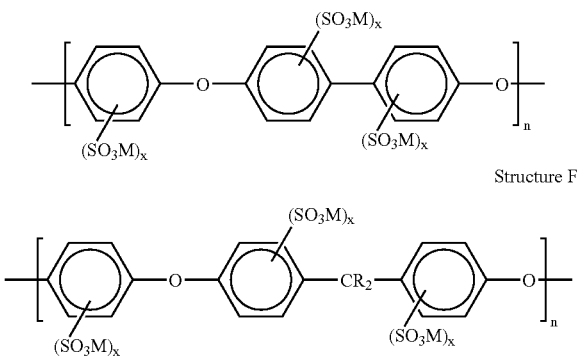

Structure E

Structure F wherein n, m, and x are integers and $R_2$ is a hydrocarbyl group.

The WSASPs of the present disclosure are compatible with other components commonly used in cement compositions. The amount of WSASP present in the cement composition may be in a range of from about 0.1% to about 5%, alternatively from about 1.1% to about 2%, or alternatively from about 1.2% to about 1.5%, all percentages being by weight of the cement (bwoc).

In an embodiment, the cement composition comprises water and a cement such as hydraulic cement, which includes calcium, aluminum, silicon, oxygen, and/or sulfur and which sets and hardens by reaction with the water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

The cement composition may include a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement.

In some embodiments, additives may be included in the cement composition comprising a WSASP for improving or changing the properties thereof. Examples of such additives include but are not limited to salts, accelerants, surfactants, set retarders, defoamers, settling prevention agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

The cement compositions comprising a WSASP may have a density from about 4 lb/gallon (ppg) to about 23 ppg. In an embodiment, the cement compositions comprising a WSASP may have a density from about 12 ppg to about 17 ppg. In alternative embodiments, the cement compositions comprising a WSASP may be low-density cement compositions with a density from about 6 ppg to about 14 ppg. Density reducing additives such as glass beads or foam and expanding additives such as gas, suspension aids, defoamers and the like may be included in the cement composition to generate a lightweight cement slurry. Amounts of such density-reducing additives and methods for their inclusion are known to one of ordinary skill in the art.

The components of the cement composition comprising a WSASP may be combined in any order desired by the user to form a slurry that may then be placed into a wellbore. The components of the cement composition comprising a WSASP may be combined using any mixing device compatible with the composition, for example a bulk mixer. In an embodiment, the WSASP is available in an aqueous solution and is thus combined with the water before it is mixed with the cement to form a pumpable slurry. In an alternative embodiment, the WSASP is available as solid particles and is thus combined with the cement before water is introduced to the cement.

The cement compositions comprising a WSASP may display reduced transition times when compared to a similar or otherwise identical composition lacking a WSASP. As used herein, the transition time of a cement composition is defined as the period of time after the composition is placed into a wellbore annulus during which the pressure exerted on the subterranean formation by the cement composition is less than the pressure of the gas or water in the formation such that gas or water migration into the composition can occur. The transition time ends when the cement composition is sufficiently set such that gas or water may no longer migrate into the cement composition. The transition time is typically the time ranging from when the gel strength of the composition is about 100 lbf/100 ft$^2$ to when it is about 500 lbf/100 ft$^2$. Due to the presence of the WSASP in the cement compositions, the transition times of the compositions are typically less than or equal to about 90 minutes, alternatively less than or equal to about 80 minutes, alternatively less than or equal to about 70 minutes, alternatively less than or equal to about 60 minutes, alternatively less than or equal to about 50 minutes, alternatively less than or equal to about 40 minutes, alternatively less than or equal to about 30 minutes, alternatively less than or equal to about 20 minutes, or alternatively less than or equal to about 10 minutes. As a result, a cement composition comprising a WSASP may be pumped to its desired location in a wellbore, e.g., the annulus, and allowed to set without being concerned that gas or water migration could compromise its ability to seal an area of the wellbore. That is, there is insufficient time for the gas or water to migrate into and through the cement composition and form flow channels therein. The WSASP thus serves as a gas or water migration control additive in the cement compositions.

In an embodiment, the cement compositions comprising a WSASP may display a lengthened zero gel time (ZGT) when compared to a similar or otherwise identical composition lacking a WSASP. The ZGT refers to the time required for the cement composition to reach a static gel strength of 100 lbf/100 ft$^2$ after the slurry has been allowed to stay static, in the downhole situation. The cement compositions comprising a WSASP may be further characterized by a longer thickening time that allows the composition to remain pumpable during downhole placement before rapidly setting when compared to a similar or otherwise identical composition lacking a WSASP. The thickening time refers to the time required for the cement composition to achieve 70 Bearden units of Consistency (Bc). At about 70 Bc, the slurry undergoes a conversion from a pumpable fluid state to a non-pumpable paste.

In an embodiment, a cement composition comprising a WSASP has a reduced occurrence of false set in comparison to a similar or otherwise identical composition lacking a WSASP. Typically, a set accelerator such as an alkaline metal salt is added to a cement composition to improve the strength development of the cement. However, at temperatures lower than about 40° F., the rate of compressive strength development is slow and may require the addition of an excessive amount of accelerator to reduce the waiting on cement (WOC). The addition of an excessive amount of set accelerator often results in the premature gellation of the cement composition, also known as false set. Herein false set refers to the rapid development of viscosity in a freshly mixed cement composition, without the evolution of much heat. False set cement compositions have a sufficiently high viscosity to render them unpumpable while having no appreciable compressive strength.

The cement compositions comprising a WSASP may require less time to develop an appreciable compressive strength when compared to a similar or otherwise identical composition having comparable thickening time and lacking a WSASP. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of both the cement maturity (or cure time) and the temperature at which setting occurs. The cement maturity specifically refers to the time the cement formulation is allowed to set. With regard to temperature, the lower the temperature, the longer the time required for the cement composition to attain compressive strength.

In an embodiment, the cement compositions of this disclosure develop compressive strength in less time at any temperature than a similar or otherwise identical cement compositions having comparable thickening times and lacking a WSASP. In an alternative embodiment, the cement compositions of this disclosure develop compressive strength in less time at a temperature of less than about 80° F., alternatively at less than about 70° F., alternatively at less than about 60° F., alternatively at less than about 50° F., alternatively at less than about 40° F., alternatively at less than about 30° F., alternatively at less than about 20° F., alternatively at less than about 10° F., than a similar or otherwise identical cement composition having comparable thickening time and lacking a WSASP. In some embodiments, the term "alternative similar cement composition" is used to compare physical properties other than compressive strength. Such alternative similar cement compositions may, or may not, have a comparable thickening time as is recited in similar or otherwise identical cement compositions used for comparison of compressive strength values.

As illustrated in the examples below, the cement compositions comprising a WSASP also exhibit a relatively constant viscosity for a period of time after they are initially prepared and while they are being placed in their intended locations in the wellbore, i.e., during the period when the slurry in motion. Eventually, the cement compositions quickly set such that the viscosity increases from about 35 Bc to equal to or higher than 70 Bc in less than about 60 minutes, alternatively less than about 50 minutes, alternatively less than about 40 minutes, alternatively less than about 30 minutes, alternatively less than about 20 minutes, alternatively less than about 10 minutes, alternatively less than about 1 minute. This sudden jump in viscosity may be very desirable in preventing the gas migration because it indicates the quick formation of impermeable mass from a gelled state after placement. This behavior is often referred to as "Right Angle Set" and such cement compositions are called "Right Angle Set Cement Compositions" in reference to the near right angle increase shown in a plot of viscosity over time. In contrast, the viscosity of conventional cement compositions typically increases gradually over time to its maximum value. An example of right angle set is shown in FIG. 1 and described in more detail herein.

The cement compositions comprising a WSASP may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to, cement slurries, drilling fluids or muds, spacer fluids, fracturing fluids or completion fluids, all of which are well known in the art. Without limitation, servicing the wellbore includes positioning the cement composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

The cement compositions comprising a WSASP may be introduced to the wellbore to prevent the loss of aqueous or non-aqueous drilling fluids into loss-circulation zones such as voids, vugular zones, and natural or induced fractures while drilling. In an embodiment, the cement composition comprising a WSASP is placed into a wellbore as a single stream and activated by downhole conditions to form a barrier that substantially seals loss circulation zones. In such an embodiment, the cement composition comprising a WSASP may be placed downhole through the drill bit forming a composition that substantially eliminates the lost circulation. In yet another embodiment, the cement composition comprising a WSASP is formed downhole by the mixing of a first stream comprising one or more cement composition components and a second stream comprising additional cement composition components. For example, the cement compositions comprising a WSASP may be formed downhole by the mixing of a first stream comprising a cement and a second stream comprising the WSASP. Methods for introducing compositions into a wellbore to seal subterranean zones are described in U.S. Pat. Nos. 5,913,364; 6,167,967; and 6,258,757, each of which is incorporated by reference herein in its entirety.

The cement compositions comprising a WSASP may form a non-flowing, intact mass inside the loss-circulation zone which plugs the zone and inhibits loss of subsequently pumped drilling fluid, which allows for further drilling.

In an embodiment, the cement compositions comprising a WSASP may be employed in well completion operations such as primary and secondary cementing operations. The cement composition comprising a WSASP may be placed into an annulus of the wellbore and allowed to set such that it isolates the subterranean formation from a different portion of the wellbore. The cement composition comprising a WSASP thus forms a barrier that prevents fluids in that subterranean formation from migrating into other subterranean formations. Within the annulus, the cement composition comprising a WSASP also serves to support a conduit, e.g., casing, in the wellbore. In an embodiment, the wellbore in which the composition is positioned belongs to a multilateral wellbore configuration. It is to be understood that a multilateral wellbore configuration includes at least two principal wellbores connected by one or more ancillary wellbores.

In secondary cementing, often referred to as squeeze cementing, the cement compositions comprising a WSASP may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In other embodiments, additives are also pumped into the wellbore with the cement compositions comprising a WSASP. For instance, fluid absorbing materials, particulate materials, resins, aqueous superabsorbers, viscosifying agents, suspending agents, dispersing agents, or combinations thereof can be pumped in the stream with the cement compositions disclosed.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

The effect of the addition of a WSASP on the thickening time of three typical lightweight cement slurries (density=12 ppg) at 50° F. and atmospheric pressure were compared. The thickening time or the time required for each cement slurry to achieve 70 Bc was determined using a HPHT Consistometer while continuously shearing the composition according to API Recommended Practices 10B, Twenty-Second Edition, December 1997. At about 70 Bc the slurry undergoes a conversion from a pumpable fluid state to a non-pumpable paste. The composition of each of these Slurries 1-3 is given in Tables 1-3.

TABLE 1

| Slurry 1 | | |
|---|---|---|
| Sea Water | 57.4% | bwoc |
| Cement Class G | 100% | |
| MICRO MATRIX hydraulic cement | 20% | bwoc |
| HGS3000 glass bubbles | 12% | bwoc |
| CFR-3L cement dispersant | 0.75 | gal/sk |
| HALAD 344 EXP low water loss additive | 0.20 | gal/sk |
| DAIR 300L antifoaming agent | 0.025 | gal/sk |
| Density = 12 ppg | | |

TABLE 2

| Slurry 2 | | |
|---|---|---|
| Sea Water | 61% | bwoc |
| Cement Class G | 100% | |
| MICRO MATRIX hydraulic cement | 20% | bwoc |
| HGS3000 glass bubbles | 12% | bwoc |
| CFR-3L cement dispersant | 0.75 | gal/sk |
| HALAD 344 EXP low water loss additive | 0.20 | gal/sk |
| DAIR 300L antifoaming agent | 0.025 | gal/sk |

TABLE 2-continued

| Slurry 2 | | |
|---|---|---|
| CaCl$_2$ Liquid | 0.5 | gal/sk |
| Density = 12 ppg | | |

TABLE 3

| Slurry 3 | | |
|---|---|---|
| Sea Water | 63% | bwoc |
| Cement Class G | 100% | |
| MICRO MATRIX hydraulic cement | 20% | bwoc |
| HGS3000 glass bubbles | 12% | bwoc |
| CFR-3L cement dispersant | 0.40 | gal/sk |
| HALAD 344 EXP low water loss additive | 0.20 | gal/sk |
| DAIR 300L antifoaming agent | 0.025 | gal/sk |
| FDP-C750-04 | 0.30 | gal/sk |
| CaCl$_2$ Liquid | 0.5 | gal/sk |
| Density = 12 ppg | | |

Cement class G is a Portland Hydraulic Cement, MICRO MATRIX hydraulic cement is an ultra-fine cement, CFR-3L cement dispersant is a particle dispersing agent, HALAD 344 EXP low water loss additive is a fluid loss additive and, DAIR 300L antifoaming agent is a defoamer all of which are commercially available from Halliburton Energy Service. FDP-C750-04 is a sulfonated polystyrene commercially available from Halliburton Energy Services and HGS3000 glass bubbles are glass beads commercially available from 3M. In Slurries 2 and 3 a set accelerator, CaCl$_2$, was included. The consistency in Bearden units was determined as a function of time, as shown in FIG. 1. The results demonstrate that the addition of an excessive amount of a set accelerator, i.e. CaCl$_2$, results in premature gellation as evinced by the rapid thickening time and the false set seen for Slurry 2. The results indicate that Slurry 2 with a short thickening time would rapidly become unpumpable. However, Slurry 3 containing the WSASP has a longer thickening time and a very controlled viscosity throughout the elapsed time that rises in a right-angled set.

Example 2

The compressive strength, transition time and ZGT of Slurries 1-3 in Example 1 were determined and compared. The transition time and ZGT of each cement composition were determined according to the following procedure using a "MINIMACS" Instrument at 300° F. and 10,000 psi.

The MINIMACS Analyzer measures the shear resistance of a cement slurry under downhole temperature and pressure while the cement remains essentially static. The test is conducted by mixing the slurry and placing it into the MINIMACS Analyzer. The slurry is then stirred and heated to a bottom hole circulating temperature (BHCT) and downhole pressure according to the same schedule as the thickening time test. After the slurry reaches the BHCT, stirring is stopped and the slurry is allowed to essentially remain static. The stirring paddle is rotated at a rate of about 0.5°/min while the shear resistance on the paddle is measured. The shear resistance is correlated to the SGS (units are lb/100 ft$^2$) and a plot of Static Gel Strength (SGS) development is made as a function of time. In each case, the slurry went static after 2 hours circulation at 60° F. The compressive strength of the cement compositions was determined in accordance with API Recommended Practices 10B, Twenty-Second Edition, December 1997. Compressive strength was measured by conventional Tinius Olsen Load Frame equipment using (2"×2"×2") set cubes.

Figure 2:
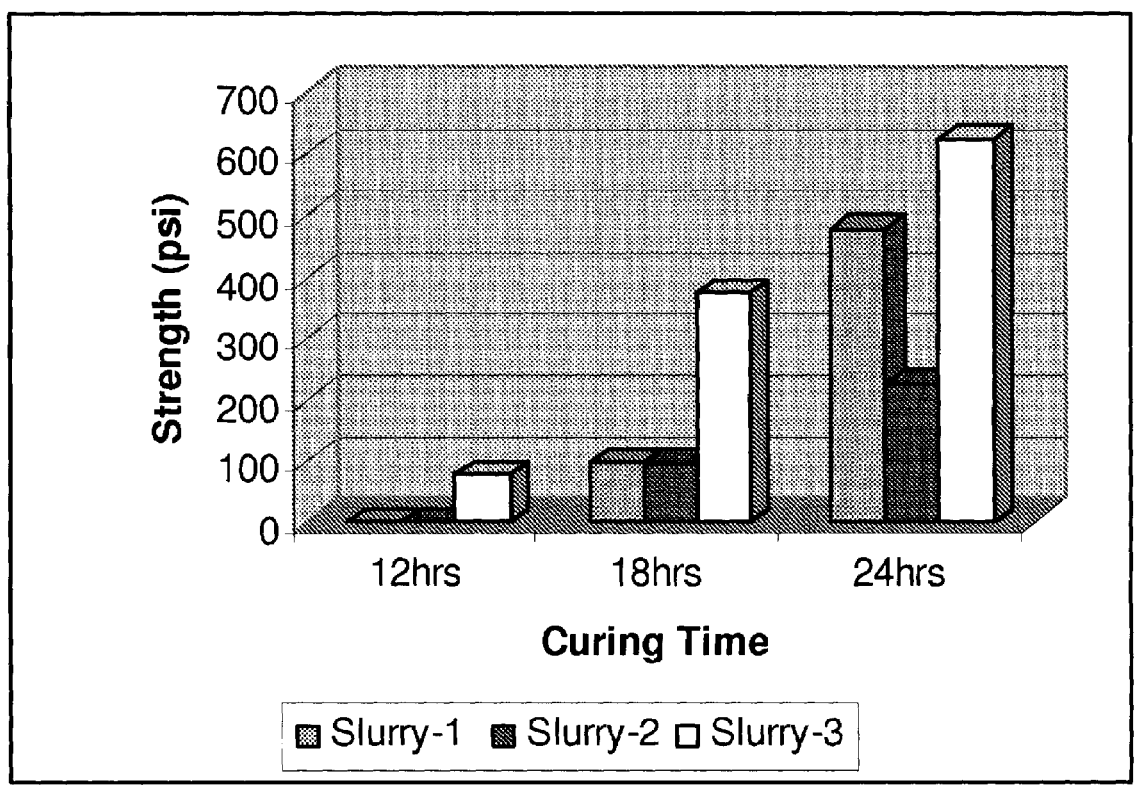
FIG. 2 is a graph of compressive strength as a function of time.

Table 4 and FIG. 2 demonstrate that although Slurry 3 has a longer thickening time it develops compressive strength much faster than Slurry 1 or Slurry 2, Table 4. Specifically, after 12 hours Slurries 1 and 2 have developed no compressive strength whereas Slurry 3 containing the WSASP has a compressive strength of 79 psi. Furthermore, after 24 hours Slurry 3 has a compressive strength that is 1.3 times greater and 2.7 times greater than those observed for Slurries 1 and 2 respectively. Even though slurry 2 has shorter thickening time (due to addition of $CaCl_2$) it develops compressive strength at much slower rate compared to that of slurry 3.

TABLE 4

| Slurry | Compressive Strength (psi) | | | Thickening Time (70Bc) |
| --- | --- | --- | --- | --- |
| | 12 hrs | 18 hrs | 24 hrs | |
| Slurry 1 | NONE | 97 | 477 | 4:36 |
| Slurry 2 | NONE | 96.3 | 226 | 2:25 |
| Slurry 3 | 79 | 374 | 624 | 6:17 |

These results demonstrate that the addition of a WSASP to the cement composition enables the early development of compressive strength while maintaining a desirable thickening time with a steady low viscosity.

Furthermore, Slurry 3 displays the desired shortened transition time and lengthened ZGT, Table 5.

TABLE 5

| Slurry type | TT (hr:min) | ZGT (hr:min) |
| --- | --- | --- |
| Slurry 1 | 5:29 | 0.39 |
| Slurry 3 | 1:17 | 2:12 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A cement composition comprising a water-soluble aromatic sulfonated polymer, wherein the cement composition develops a compressive strength of greater than about zero in less time than a similar cement composition having comparable thickening time and lacking a water-soluble aromatic sulfonated polymer and wherein the water-souble aromatic sulfonated polymer comprises a comonomer selected from the group consisting of maleic anhydride, acrylic acid, AMPS (2-acrylamido-2-methyl-1-propane sulfonic acid), methallysulfonic acid, and combinations thereof.

2. The composition of claim 1 wherein the cement composition develops a compressive strength of greater than about zero at a temperature of less than about 80° F. in less time than the similar cement composition having comparable thickening time and lacking a water-soluble aromatic sulfonated polymer.

3. The composition of claim 1 having a reduced occurrence of false set than an alternative similar cement composition lacking a water-soluble aromatic sulfonated polymer.

4. The composition of claim 1 having a thickening time greater than an alternative similar cement composition lacking a water-soluble aromatic sulfonated polymer.

5. The composition of claim 1 having a zero gel time greater than an alternative similar cement composition having comparable thickening time and lacking a water-soluble aromatic sulfonated polymer.

6. The composition of claim 1 displaying a right angle set.

7. The composition of claim 1 wherein the cement composition has a transition time of less than or equal to about 90 minutes.

8. The composition of claim 1 wherein the cement composition has a transition time of less than or equal to about 60 minutes.

9. The composition of claim 2 wherein the cement composition has a transition time of less than or equal to about 30 minutes.

10. The composition of claim 1 wherein the water-soluble aromatic sulfonated polymer comprises a polymeric backbone having one or more sulfonated aromatic rings.

11. The composition of claim 10 wherein the one or more sulfonated aromatic rings are selected from the group consisting of phenyl rings, naphthyl rings, anthracenyl rings, phenanthrenyl rings, and combinations thereof.

12. The composition of claim 1 wherein the water-soluble aromatic sulfonated polymer has one of the chemical structures A-F:

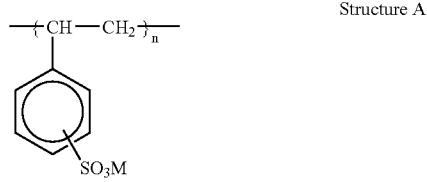

Structure A

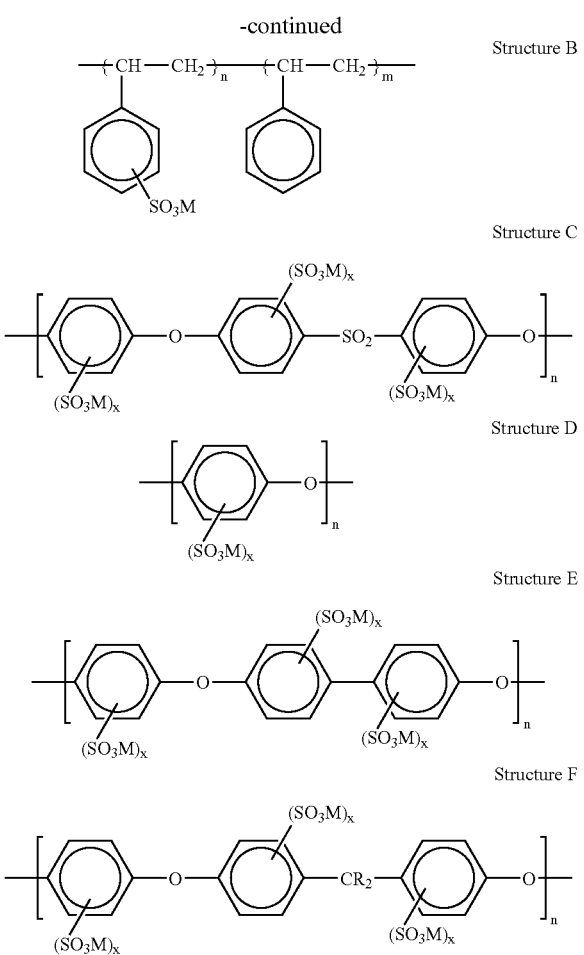

wherein n, m, and x are integers, $R_2$ is a hydrocarbyl group, and M is hydrogen, an alkali or alkaline earth metal, ammonium, or combinations thereof.

13. The composition of claim 1 wherein the water-soluble aromatic sulfonated polymer comprises a partially or completely sulfonated polystyrene; a poly(styrene sulfonic acid); a polymer of allyloxybenzenesulfonic acid; sulfonated gilsonite; sulfonated lignin; a copolymer of sulfonated styrene, sulfonated alpha-methylstyrene, sulfonated vinyl styrene, or combinations thereof; or combinations thereof.

14. The composition of claim 1 wherein the water-soluble aromatic sulfonated polymer comprises a polymeric backbone having sulfonated aromatic rings pendant groups, wherein the polymeric backbone does not contain any aromatic rings.

15. The composition of claim 1 wherein the cement composition further comprises a defoamer.

16. The composition of claim 1 having a density of less than about 14 pounds per gallon.

17. A cement composition comprising a water-soluble aromatic sulfonated polymer, wherein the cement composition has a density of less than about 14 pounds per gallon and displays a right angle set.

18. The cement composition of claim 17 further comprising density reducing beads.

19. The composition of claim 17 having a compressive strength of greater than about 75 psi that develops in about 12 hours.

20. The composition of claim 17 having a shortened transition time and lengthened zero gel time when compared to an otherwise similar composition prepared in the absence of a water-soluble aromatic sulfonated polymer.

* * * * *